April 6, 1965

W. A. SHAW 3,176,619

PLUNGER CONSTRUCTION

Filed April 13, 1961

WILLIAM A. SHAW
INVENTOR.

BY *Lyon+Lyon*

ATTORNEYS

WILLIAM A. SHAW
*INVENTOR.*

BY *Lyon & Lyon*

ATTORNEYS

United States Patent Office 3,176,619
Patented Apr. 6, 1965

3,176,619
PLUNGER CONSTRUCTION
William A. Shaw, Los Angeles, Calif., assignor to Camco Incorporated, Houston, Tex., a corporation of Texas
Filed Apr. 13, 1961, Ser. No. 102,828
10 Claims. (Cl. 103—52)

This invention relates to free piston well pumping apparatus and is particularly directed to improvements in the construction of the plunger which travels substantially the full length of the eduction tube. This invention relates to improvements over the plunger shown in the Knox et al. Patent 2,642,002 and the Knox Patent 2,684,633.

Since the eduction tube is composed of a plurality of tubing sections connected end to end by means of threaded couplings, the plunger must be capable of passing through the coupling joints without interference. Moreover, the sealing parts of the plunger must fit closely within the inner surface of the tubing sections in order to minimize leakage of well fluid past the sealing parts. In the Knox and Knox et al. patents, referred to above, deflection bars with integral wing segments were employed to meet the conflicting requirements of forming an effective seal within the inner surface of the tubing sections, and at the same time providing for easy passage of the plunger through joints between tubing sections. In the present invention the deflector bars are omitted and a different type of segmental ring sealing elements are employed at considerable reduction in cost and without sacrifice of performance and efficiency.

It is an important object of this invention to provide a novel form of expansible ring segments which readily pass through joints between tubing sections while maintaining efficient seals within the inner surfaces of such sections.

Another object of this invention is to provide a novel form of plunger valve which is maintained in closed position while the plunger moves upward through the sectional eduction tube and which remains in open position while the plunger is descending. Furthermore, the valve is automatically closed when the plunger reaches the lower limit of its travel. Another object is to provide a plunger valve of this type in which a spring mounted within the plunger body is effective to control two separate valve sleeves mounted to move with respect to the plunger body.

Other and more detailed objects and advantages will appear hereinafter.

Figure 1:
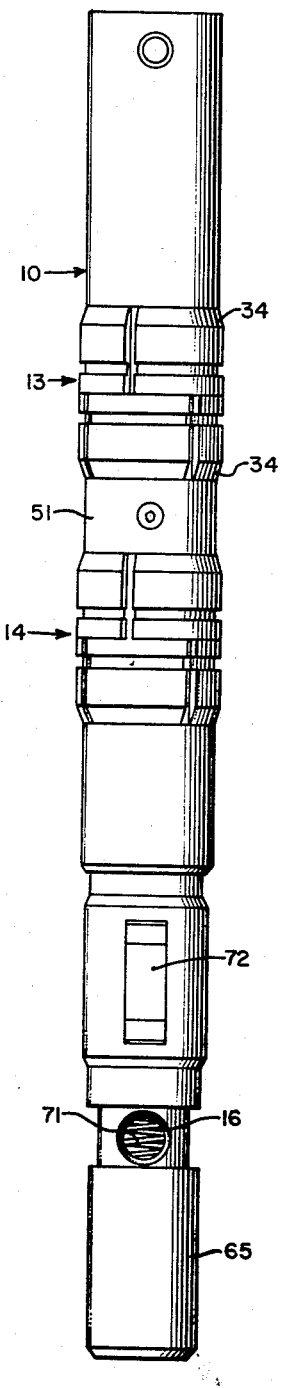
FIGURE 1 is a side elevation of a preferred embodiment of this invention.
Figure 2:
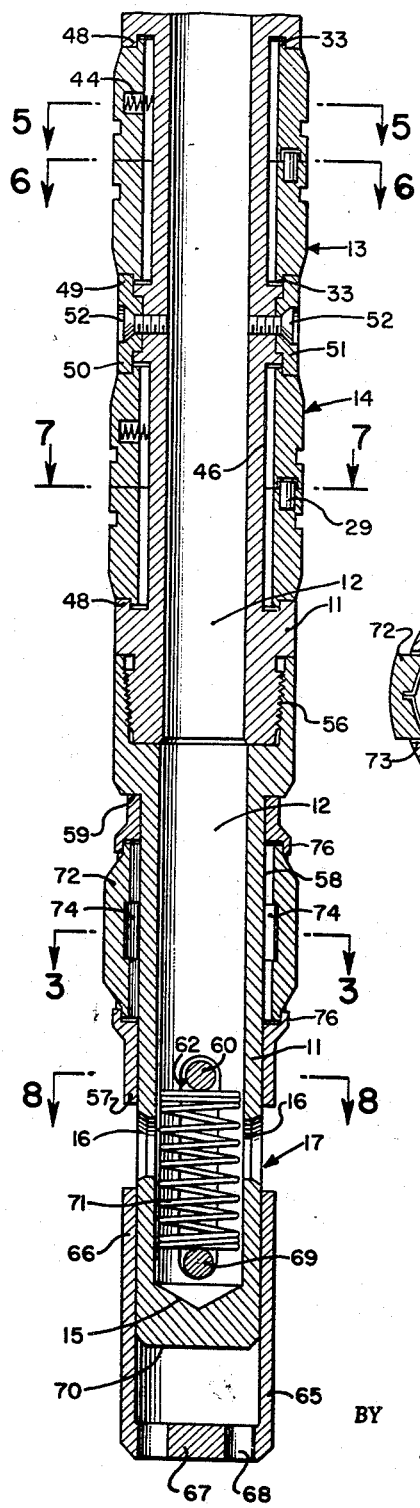
FIGURE 2 is a sectional side elevation thereof taken substantially on the lines 2—2 as shown in FIGURE 5.
Figure 3:
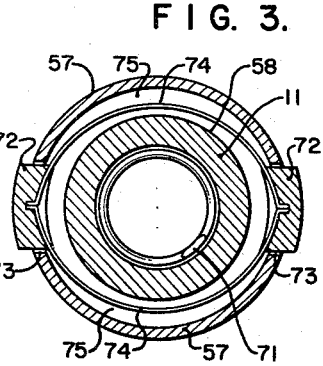
FIGURE 3 is a transverse sectional view taken substantially on the lines 3—3 as shown in FIGURE 2.
Figure 8:
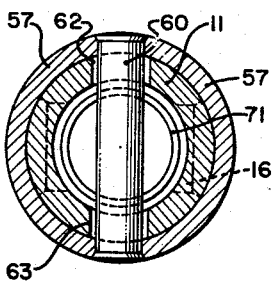
Figure 5:
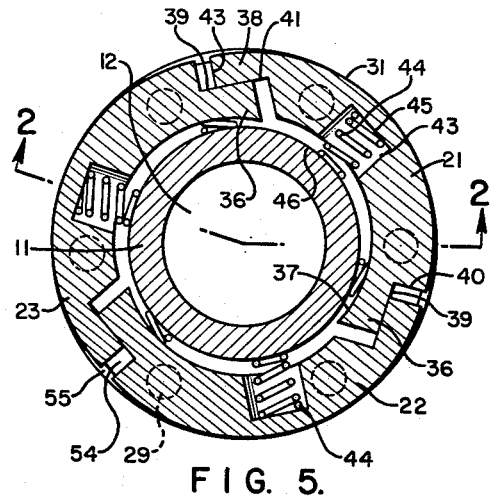
Figure 6:
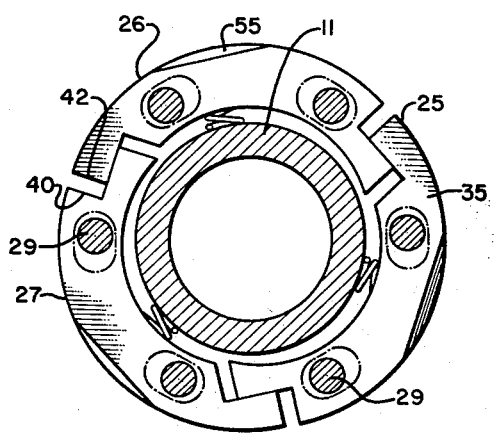
Figure 7:
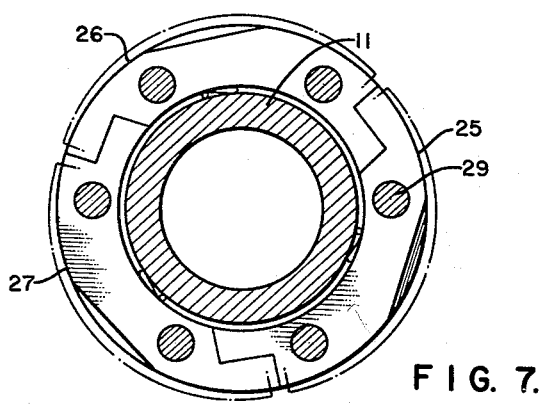

FIGURES 5 and 6 are transverse sectional views taken substantially on the lines 5—5, and 6—6 respectively, as shown in FIGURE 2, FIGURE 7 is a view similar to FIGURE 6 showing the ring segments in fully retracted position, and FIGURE 8 is a transverse sectional view taken substantially on lines 8—8 as shown in FIGURE 2.

Referring to the drawings:

The plunger generally designated 10 is adapted to travel for substantially the full length of a sectional eduction tube (not shown) in a well. The plunger includes a mandrel or body 11 having a central opening 12. Sealing assemblies, generally designated 13 and 14, are mounted on the outer surface of the body 11. The body 11 includes a tubular extension closed at the lower end 15 and provided with lateral ports 16. These lateral ports form part of a valve assembly generally designated 17. When the valve is open, the ports 16 establish communication between the central opening 12 and the space within the eduction tube and below the lower sealing assembly 14.

Figure 4:
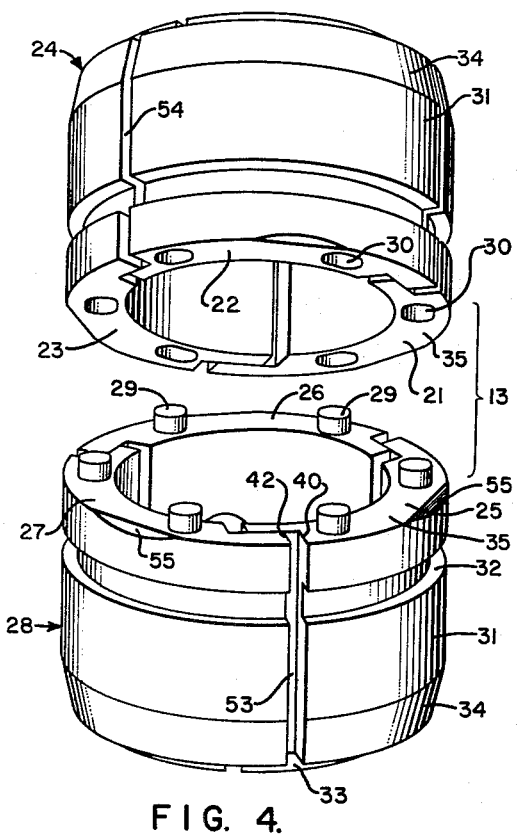
FIGURE 4 is a perspective view of one of the plunger sealing assemblies.

The sealing assemblies 13 and 14 are duplicates so only one need be described. As best shown in FIGURE 4 the sealing assembly 13 includes three metallic ring segments 21, 22 and 23 cooperating to form a segmental ring 24, and three ring segments 25, 26 and 27 cooperating to form a segmental ring 28. The ring segments are all duplicates except that those in the segmental ring 28 are each provided with a pair of axially extending circumferentially spaced pins 29 while each of the segments in the segmental ring 24 are provided with circumferentially elongated recesses 30 to receive the pins 29. While the sealing assembly 13 has been shown with the segmental ring 24 on top and the segmental ring 28 on the bottom, the entire sealing assembly 13 could be inverted so that the segmental ring 28 would be positioned above the segmental ring 24.

Each of the ring segments has a cylindrical outer surface 31 interrupted by a circumferential groove 32. At one end of each segment is a circumferentially extending skirt 33 and a frusto-conical portion 34 which merges with the cylindrical surface 31. A radial surface 35 is provided on each segment at the end opposite the location of the skirt 33. The pins 29 are mounted in segments 25, 26 and 27 and project beyond this radial surface 35. The elongated recesses 30 in the segments 21, 22 and 23 intersect the radial surfaces 35 and receive the pins 29.

A lap joint is formed at the opposite edges of each segment with the neighboring segment in the same segmental ring. Each segment has a projection 36 along one side edge adjacent the inner cylindrical surface 37 and has a projection 38 along the other side edge adjacent the outer cylindrical surface 31. One side of each projection 36 is defined by a wall 39 which is perpendicular to the radial shoulder 40. Similarly, one side of each projection 38 is defined by a wall 41 which is perpendicular to the radial shoulder 42. The wall 41 on each segment lies in surface contact with the wall 39 on the next adjacent segment as the projections 38 each overlie one of the projections 36.

Each ring segment is provided with a radially extending blind pocket 43 which receives a coil spring 44. The coil spring bears at one end against the floor 45 of its respective pocket 43 and at the other end bears against the outer cylindrical surface 46 of the body or mandrel 11.

The ring segments are assembled around the body or mandrel 11 so that each sealing assembly includes six segments, three in upright position and three in inverted position, with the pins 29 extending into the recesses 30. The skirts 33 on the end of each segmental ring extend within a lip 48 provided on the body 11 or within lips 49 or 50 provided on the split collar 51. The halves of the collar 51 are each held in place on the body 11 by means of threaded fastenings 52. The lips 48, 49, and 50 prevent relative axial movement between the ring segments and the body 11. It will be observed that the segmental rings 24 and 28 in the sealing assembly 13 are assembled in circumferentially staggered relationship so that the axially extending grooves 53 between segments 25, 26 and 27 are misaligned with respect to axially extending grooves 54 between segments 21, 22 and 23.

The pin receiving recesses 30 are elongated in a circumferential direction so that the segments in one of the segmental rings 24 or 23 may move radially with respect to the other. The action of the springs 44 is to urge each of the segments to move radially outwardly from the fully retracted position shown in full lines in FIGURE 7 to the fully extended position shown in phantom lines in that figure. This radial movement in an outward direction is limited by contact between the cylindrical surfaces 31 and the inner surface of the eduction tube (not shown). The radial outward movement of the individual segments is further limited by engagement of the skirts 33 with the lips 48, 49 and 50 on the body 11 and split collar 51. The tapering portion of the sealing assemblies provided with the frusto-conical surfaces 34 enables the sealing parts to pass joints between tubing sections without difficulty and to pass through tight spots, if any, within the tubing, and cause radial contraction of the segments against the force of the springs 44. Central portions of the intersection of the surfaces 31 and 35 are chamfered or bevelled as shown at 55 to eliminate any projecting edge.

The lower portion or extension of the body may be connected to the upper portion thereof by means of threads 56 but the two portions function as a single integral unit. The valve assembly 17 carried on the lower portion of the body or mandrel 11 includes a sleeve 57 mounted to slide on the outer cylindrical surface 58 of the body 11. The upper end of the sleeve 57 is adapted to contact the downward facing abutment 59 formed on the body 11. A transverse pin 60 is fixed in the lower portion of the sleeve 57 and extends radially through axial slots 62 and 63 formed in the body 11. When the sleeve 57 slides downward with respect to the body 11 to cover the ports 16 the transverse pin 60 travels in the body slots 62 and 63.

A cap 65 having a sleeve portion 66 is mounted to slide on the outer cylindrical surface 58 of the body 11. This cap has an end wall 67 provided with apertures 68. A second transverse pin 69 is fixed on the cap 65 and extends through the same body slots 62 and 63. When the cap 65 is moved to bring the lower end 70 of the body 11 into contact with the end wall 67, the transverse pin 69 travels in the body slots 62 and 63.

A pre-loaded coil spring 71 is mounted within the interior of the body 11 between the transverse pins 60 and 69 and is confined within a distance less than its normal free length. In the position of the parts shown in FIGURE 2, the spring 71 holds the sleeve 57 against the abutment 59, there being clearance between the transverse pin 60 and the upper ends of the body slots 62 and 63.

Friction drag means are provided on the sleeve 57 for frictionally engaging the inner surface of the sectional eduction tube. As shown in the drawings, the friction drag means comprises drag blocks 72 projecting through windows 73 formed in the sleeve 57. Resilient spring elements 74 are mounted in the annular space 75 between the sleeve 57 and the outer surface 58 of the body 11. These resilient spring elements 74 serve to apply radial force against the blocks 72 to move them outwardly through the windows 73. This movement is limited by contact of the block 72 with the inner surface of the tubing sections (not shown) or by contact with the lips 76 provided on the sleeve 57 adjacent the upper and lower ends of the window openings 73.

When plunger 10 is descending through the sectional eduction tube after lifting a load of well fluid to the surface, the friction drag of the blocks 72 along the inner surface of the tubing sections holds the sleeve 57 in its upper position against the abutment 59. The spring 71 assists in this action. The cap 65 is maintained in its lowermost position by the action of the same spring 71 against the lower transverse pin 69. Accordingly, the valve ports 16 remain open so that gas or well fluid within the eduction tube may pass inward through the ports 16 and through the central opening in the opening 12 in the plunger 10 as the plunger descends.

When the plunger 10 reaches the lower limit of its travel in the eduction tube the cap 65 strikes an abutment, not shown, in the eduction tube and the weight of the plunger 10 acts through the abutment 59, sleeve 57 and transverse pin 70 to compress the internal spirng 71. This allows the sleeve portion 66 of the cap 65 to close off the valve portions 16, thus cutting off flow into the interior of the plunger 10.

When the gas pressure below the plunger 10 increases sufficiently the plunger moves upward within the eduction tube carrying a load of well fluid above it. The valve 17 remains closed because the drag blocks 72 exert a downward force on the sleeve 57 as the plunger moves upward toward the surface.

Having fully described my invention, it is to be understood that I do not wish to be limited to the details set forth herein but my invention is of the full scope of the appended claims.

I claim:

1. In a fluid operated plunger for travel in a sectional eduction tube, the combination comprising: a tubular body, a valve on the tubular body operable to prevent flow of fluid therethrough, expansible sealing elements on the body adapted for sealing engagement with the interior of the eduction tube, said sealing elements including a pair of segmental rings, each of said segmental rings comprising a plurality of ring segments, the ring segments of one segmental ring each having a pair of axially extending circumferentially spaced pins projecting into recesses provided on the segments of the other segmental ring, resilient means acting on said segments to move them radially outward, and means on the body limiting outward movement of said segments.

2. In a fluid operated plunger for travel in a sectional eduction tube, the combination comprising: a tubular body, a valve on the tubular body operable to prevent flow of fluid therethrough, expansible sealing elements on the body adapted for sealing engagement with the interior of the eduction tube, said sealing elements including a pair of segmental rings, each of said segmental rings comprising a plurality of ring segments, the ring segments of one segmental ring each having a pair of axially extending circumferentially spaced pins projecting into recesses provided on the segments of the other segmental ring, the segments otherwise being duplicates, said segments having laterally extending side projections forming lap joints and axially extending grooves with respect to adjacent segments, resilient means acting on each segment to move it radially outward, and means on the body limiting outward movement of said segments.

3. In a fluid operated plunger for travel in a sectional eduction tube, the combination comprising: a tubular body, a valve on the tubular body operable to prevent flow of fluid therethrough, expansible sealing elements on the body adapted for sealing engagement with the interior of the eduction tube, said sealing elements including a pair of segmental rings, each of said segmental rings comprising a plurality of ring segments, the ring segments of one segmental ring each having a pair of axially extending circumferentially spaced pins projecting into recesses provided on the segments of the other segmental ring, said segments having laterally extending side projections forming lap joints and axially extending grooves with respect to adjacent segments, the segments in one segmental ring being assembled with respect to the segments in the other segmental ring such that the joints and axial grooves are circumferentially staggered, resilient means acting on said segments to move them radially outward, and means on the body limiting outward movement of said segments.

4. In a fluid operated plunger for travel in a sectional eduction tube, the combination comprising: a tubular body, a valve on the tubular body operable to prevent flow of fluid therethrough, a pair of segmental rings each comprising a plurality of ring segments, the ring segments of one segmental ring each having two axially extending circumferentially spaced pins projecting into recesses provided on the ring segments of the other segmental ring, said segments each having laterally extending projections forming lap joints, the pins on each ring segment extending into recesses on two different ring segments, resilient means acting on each segment to move it radially outward, and means on the body limiting outward movement of said segments.

5. In a fluid operated plunger for travel in a sectional eduction tube, the combination comprising: a tubular body, a valve on the tubular body operable to prevent flow of fluid therethrough, a pair of segmental rings each comprising three ring segments, the ring segments of one segmental ring each having two axially extending circumferentially spaced pins, the ring segments of the other segmental ring each having two recesses for reception of said pins, said segments each having laterally extending side projections forming lap joints, the pins on each ring segment extending into recesses on two different ring segments, resilient means acting on each segment to move it radially outward, and means on the body limiting outward movement of said segments.

6. In a fluid operated plunger for travel in a sectional eduction tube, the combination comprising: a tubular body, a valve on the tubular body operable to prevent flow of fluid therethrough, expansible sealing elements on the body adapted for sealing engagement with the interior of the eduction tube, said sealing elements including a pair of segmental rings, each of said segmental rings comprising a plurality of ring segments, the ring segments of one segmental ring each having a pair of axially extending circumferentially spaced pins projecting into recesses provided on the ring segments of the other segmental ring, the segments otherwise being duplicates, said segments having laterally extending side projections forming lap joints and axially extending grooves with respect to adjacent segments, the segments in one segmental ring being assembled with respect to the segments in the other segmental ring such that the joints and axial grooves are staggered, resilient means acting on each segment to move it radially outward, and means on the body limiting outward movement of said segments.

7. In a fluid operated plunger for travel in a sectional eduction tube, the combination comprising: a tubular body, expansible sealing elements on the tubular body adapted for sealing engagement with the interior of the eduction tube, means on said tubular body engaging said expansible sealing elements to prevent relative axial movement of said tubular body and said sealing elements, a valve on the tubular body operable to prevent flow of fluid therethrough, said valve including ports on the tubular body, a sleeve mounted on the tubular body and movable between a first position closing said ports and a second position permitting flow through said ports, resilient means on the tubular body acting to hold the sleeve in said second position, and drag block means carried on said sleeve for frictional engagement with the interior of the eduction tube and acting to oppose said resilient means when the plunger moves upward in the eduction tube.

8. In a fluid operated plunger for travel in a sectional eduction tube, the combination comprising: a tubular body, expansible sealing elements on the tubular body adapted for sealing engagement with the interior of the eduction tube, a valve on the tubular body operable to prevent flow of fluid therethrough, said valve including ports on the tubular body, a sleeve mounted on the tubular body and movable between a first position closing said ports and a second position permitting flow through said ports, drag block means carried on said sleeve for frictional engagement with the interior of the eduction tube, the tubular body having axial slots, a transverse pin fixed to said sleeve and extending through said slots, a compression spring within said tubular body engaging said transverse pin and acting to move said sleeve toward said second position.

9. In a fluid operated plunger for travel in a sectional eduction tube, the combination comprising: a tubular body, expansible sealing elements on the tubular body adapted for sealing engagement with the interior of the eduction tube, a valve on the tubular body operable to prevent flow of fluid therethrough, said valve including ports on the tubular body, a sleeve mounted on the tubular body and movable between a first position closing said ports and a second position permitting flow through said ports, drag block means carried on said sleeve for frictional engagement with the interior of the eduction tube, a cap having a sleeve portion slidably mounted on said body and movable to close said ports, the body having axial slots, a transverse pin fixed to said sleeve and extending through said slots, a second transverse pin fixed on said cap and extending through said slots, and a compression spring within said body interposed between said transverse pins and acting to move both the sleeve and cap in directions to hold said ports open.

10. In a fluid operated plunger for travel in a sectional eduction tube, the combination comprising: a tubular body, expansible sealing elements on the tubular body adapted for sealing engagement with the interior of the eduction tube, a valve on the tubular body operable to prevent flow of fluid therethrough, said valve including ports on the tubular body, two sleeve members mounted on the tubular body and each movable between a first position closing said ports and a second position permitting flow through said ports, drag block means carried on one sleeve member for frictional engagement with the interior of the eduction tube, the other sleeve member comprising a cap slidably mounted on the lower portion of said body, the body having axial slots, two transverse pins, one fixed to each of said sleeve members and extending through said slots, and a compression spring within said tubular body and interposed between said transverse pins.

References Cited by the Examiner

UNITED STATES PATENTS

| | | | |
|---|---|---|---|
| 1,172,518 | 2/16 | Dilks | 309—42 |
| 1,498,762 | 6/24 | Sullivan | 309—42 |
| 1,575,888 | 3/26 | Zublin | 103—225 |
| 1,608,947 | 11/26 | Maegly | 103—225 |
| 1,669,365 | 5/28 | Worth | 277—157 |
| 1,844,985 | 2/32 | Schuyler | 103—225 |
| 2,071,914 | 2/37 | Bentley | 277—157 |
| 2,080,297 | 5/37 | Young | 309—42 |
| 2,116,684 | 5/38 | MacGregor | 103—225 |
| 2,208,976 | 7/40 | Halfpenny | 277—157 |
| 2,237,408 | 4/41 | Burgher | 103—52 |
| 2,642,002 | 6/53 | Knox et al. | 103—52 |
| 2,674,955 | 4/54 | Hilton | 103—225 |
| 2,684,633 | 7/54 | Knox | 103—52 |
| 2,925,306 | 2/60 | Kodra et al. | 309—29 |

FOREIGN PATENTS 675,872 11/29 France.
822,087 11/51 Germany.

KARL J. ALBRECHT, Primary Examiner.

LAURENCE V. EFNER, JOSEPH H. BRANSON, Jr.,
Examiners.